United States Patent [19]

Hottel, Jr. et al.

[11] 4,132,462

[45] Jan. 2, 1979

[54] FILAMENTARY PROJECTION SYSTEM

[75] Inventors: Hoyt C. Hottel, Jr.; Robert A. Brown, both of Mattapoisett; Randall W. Moore; Paul F. Sullivan, both of Acushnet, all of Mass.

[73] Assignee: Acushnet Company, New Bedford, Mass.

[21] Appl. No.: 832,380

[22] Filed: Sep. 12, 1977

[51] Int. Cl.² ............................................. G03B 21/56
[52] U.S. Cl. .................................... 350/117; 35/29 A; 273/183 R; 273/185 A
[58] Field of Search .................. 352/39; 350/117, 120; 354/120; 35/29 A; 273/177 A, 177 B, 181 B, 181 E, 184 R, 185 A, 183 R

[56] References Cited

U.S. PATENT DOCUMENTS

| 3,072,410 | 1/1963 | Simjian | 350/117 X |
| 3,420,524 | 1/1969 | Cornell et al. | 350/117 X |
| 3,655,203 | 4/1972 | Gretzky | 350/117 X |

Primary Examiner—Richard A. Wintercorn
Attorney, Agent, or Firm—Eyre, Mann, Lucas & Just

[57] ABSTRACT

A photographic projection screen formed of separate parallel filaments having a center-to-center spacing equal to their diameters allows a projectile to be driven through it with minimal disturbance to image projected upon it.

9 Claims, 3 Drawing Figures

FILAMENTARY PROJECTION SYSTEM

BACKGROUND OF THE INVENTION

A teaching system in which an instrumented golfer drives a golf ball in an indoor driving range has been developed. The data derived from the golfer's body motions, golf club motion, and initial flight of the golf ball are analyzed to predict the total ball trajectory among other things. To enhance the illusion of realism to the golfer, a typical outdoor golf scene, showing items such as a fairway, traps and green, is projected on a screen located a few yards from him toward which he hits the ball. Further enhancing the realism, the applicant optically projects a moving simulated golf ball upon the screen after the real ball reaches the projection screen. The simulated golf ball follows the same apparent motion and perspective diminution that a real ball would appear to follow.

It would disturb the illusion of reality that applicant is attempting to create if the golf ball were to impact on the screen and distort it, or fall in sight of the golfer.

SUMMARY OF THE INVENTION

The instant invention teaches a photographic projection screen made up of a contiguous parallel array of filaments which form a planar screen surface. It is desirable that the center-to-center filament spacing be substantially equal to the filament diameter. Each filament is held in end-to-end tension relatively independently of its neighbors. When the screen is hit by a golf ball or other projectile, the filaments actually touched by the projectile are forced beyond the plane of the screen until the projectile slips by the filaments. The filaments thereupon return to their original positions. The applicant has empirically determined that a tension of from about $L^2/7.2$ to about $L^2/36$ pounds on each filament, where L is filament length in feet, gives acceptable rapid damping of screen motion after ball passage. If the tension is reduced below about $L^2/36$, the filaments are able to become disordered when hit rather than laying precisely side by side. In addition, the fundamental frequency of filament motion becomes so low that motion of the screen is prolonged to a disturbing extent. The upper limit on tension is enforced by the capacity of practical structures to resist destruction from the combined tension of all filaments in a screen. For example, if a 14 foot high by 18 foot wide screen is desired, and a filament diameter of 1/16 inch is used, each of the 3,456 filaments in the screen must have a tension of from 5.5 to 27.3 pounds. Thus the total tension in the filament direction is from about 18,816 to about 94,080 pounds (9.4 to 47 tons). The applicant has discovered that the screen performance continues to improve as the tension is increased but that the improvement is quite slow after a tension of about $L^2/18$. Thus a tension of about $L^2/18$ is determined to be the best compromise for adequate damping while keeping the structural tension within bounds.

After the ball passes through the screen it is collected suitably by an energy-absorbing backstop preferably a light-weight net behind the filamentary screen which drops the ball into a retrieval trough having a sound-deadening surface.

DETAILED DESCRIPTION OF THE PREFERRED EMBODIMENT

Figure 1:
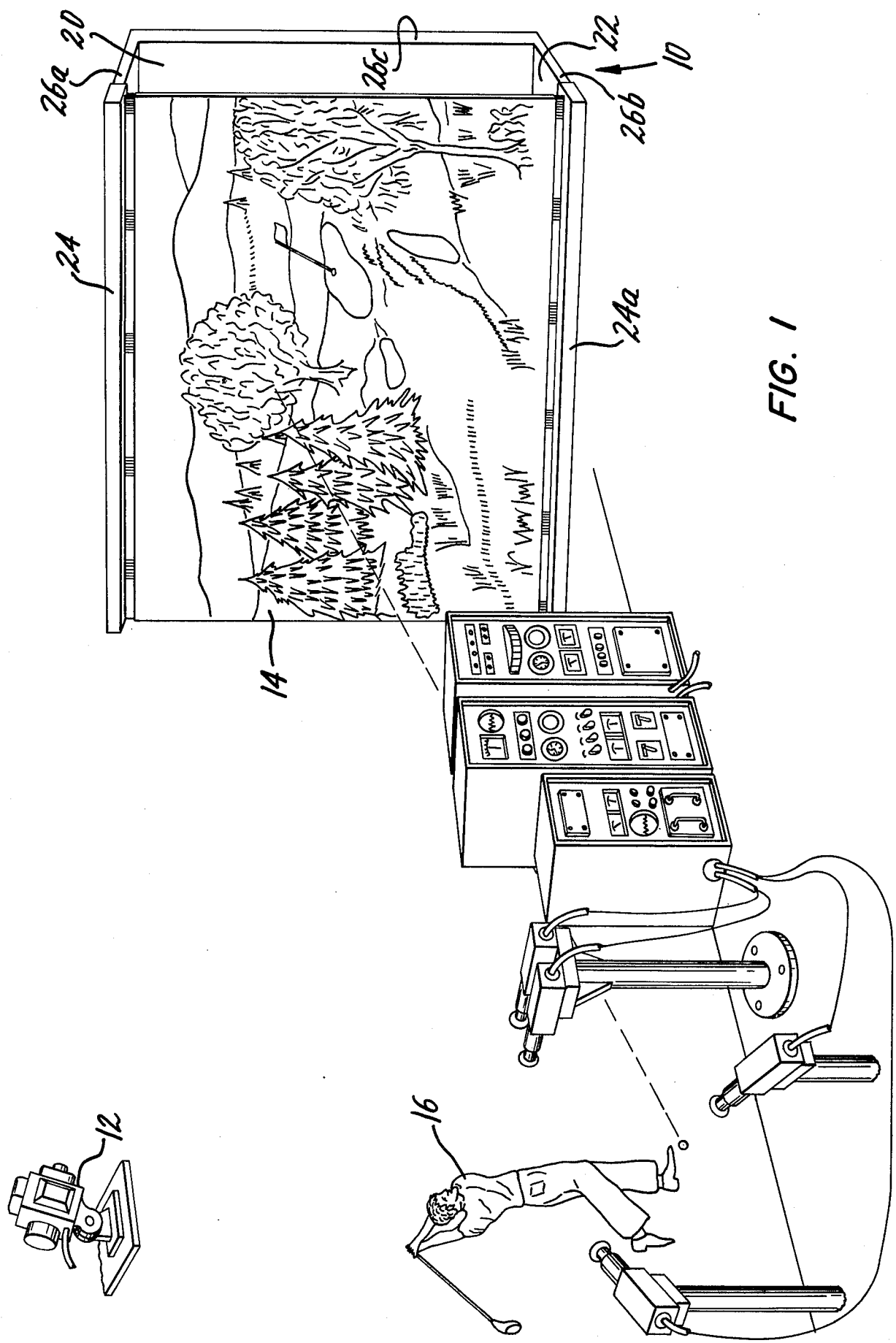
FIG. 1 shows a filamentary projection screen according to the teachings of the present invention installed in its anticipated environment.
Figure 2:
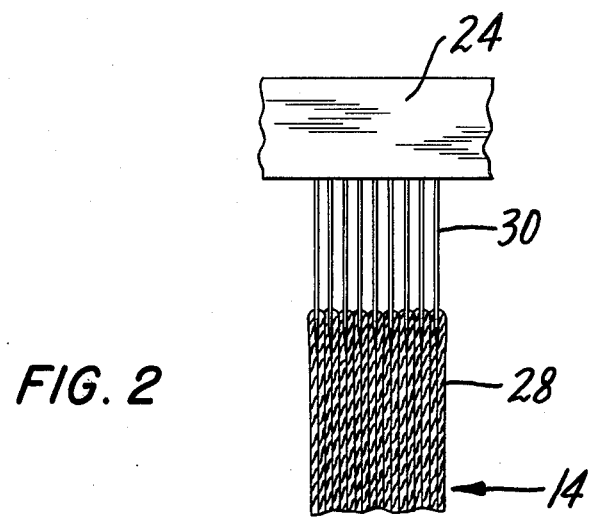
FIG. 2 shows a fragmentary cross section of the projection screen.

FIG. 1 shows the filamentary projection screen assembly at 10 within one contemplated environment in which it may be used. A projector 12 projects a scene, such as a selected golfing scene, upon the surface of the filamentary projection screen 14. A golfer 16 drives a golf ball, whose trajectory is shown by the dashed line 18, toward the screen 14. As the golf ball reaches the screen 14, it penetrates and passes between the filaments making up the screen 14 and strikes the energy-absorbing backstop 20. The backstop 20 stops the ball and allows it to drop into a retrieval trough 22.

The filamentary projection screen 14 is supported at its upper and lower edges by an upper support beam 24 and a lower support beam 24a. The upper support beam 24 and the lower support beam 24a may be embedded in the building structure to provide resistance to the tensile forces of the elements of the filamentary projection screen 14. Alternatively, the upper and lower support beams 24, 24a may be connected to a support structure such as the plurality of truss structures made up of horizontal members 26a, 26b and vertical member 26c.

Referring now to the close up of the filamentary projection screen 14, the screen 14 is composed of a closely spaced plurality of runs of parallel filaments 28. The filaments are connected between a plurality of upper support members 30 and lower support members 32. A tensioning element 34 such as a spring may be associated with at least one of the support members 30 or 32. One embodiment which has given satisfactory experimental results uses a comb of the sort used to hold the warp threads in a loom at 30 and 32. No tensioning element was necessary so none was used. The spacing between the comb teeth is known as the pitch of the comb. In the embodiment shown, the filaments 28 are threaded continuously between upper and lower support members 30 and 32 but individual filaments may be used permanently affixed to upper and lower support members 30, 32.

The center-to-center spacing of the filaments 28 should be substantially equal to the filament diameter ± 20 percent but preferably ± 10 percent. If the center-to-center spacing is substantially less than the filament 28 diameter, some filaments are forced out of the desired orderly planar array. The resulting disorder tends to produce a grainy appearance on the screen. If the center-to-center spacing is substantially greater than the filament 28 diameter, visible gaps exist between adjacent filaments. In addition, the vibration damping after passage of the ball through the screen afforded by rubbing against substantially abutting adjacent filaments 28 is reduced when gaps exist between filaments 28. This may increase the time during which vibration occurs after passage of the ball.

When a golf ball impacts against the parallel filaments 28 in the filamentary projection screen 14, it tends to find its way between them. The ability of the individual filaments 28 to yield under the impact of the golf ball, imparted by the resiliency of the filaments themselves and optionally augmented by the tensioning elements 34, further improves the penetration of screen 14 by the ball. After the passage of the ball through the screen, the filaments 28 rapidly return to their original position because of the tension which they are under.

The filaments 28 should be strong enough to resist breakage by the head-on impact with a golf ball. A filament 28 with tensile strength to failure of 10 pounds frequently breaks when hit by a driven golf ball and is thus unsatisfactory for most purposes. A minimum tensile strength to failure of about 100 pounds resists breakage and is thus satisfactory in most circumstances. The filaments 28 should be white enough for good picture imaging. In addition, the filaments should preferably be relatively free of stress relaxation and should be substantially dimensionally stable with changes in temperature and humidity in order to maintain the desired tension without adjustment. They should preferably be slippery to facilitate the passage of the ball past them. Synthetic twines such as nylon, orlon, dacron and polypropylene can be used in the filaments 28. Nylon twine is preferred because of its ready availability, lower cost, and higher tensile strength, but any synthetic filament satisfying the criteria may be used. One type of nylon twine which has been found satisfactory is Brownie Nylon Twine Type A, size 30, manufactured by Brownell & Co. Inc., Moodus Connecticut 06469. Size 30 twine is approximately 1/16 inch in diameter. When twine is used as the filaments 28, the scene projector 12 may be located for front or rear projection on the screen 14.

Figure 3:
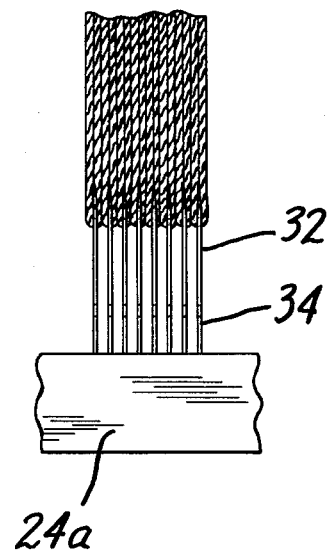
FIG. 3 shows adjacent filaments having sideways extending fibers.
Figure 3:
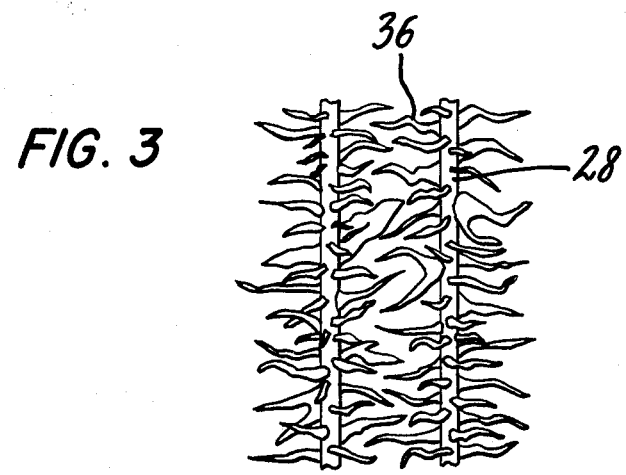

An alternate embodiment uses the fuzzy yarn shown in FIG. 3 which meets the strength, dimensional stability and color requirements previously defined. The fuzziness is imparted to the yarn by randomly directed fibers 38 extending from the yarn. The fuzziness increases the optical cross section of the yarn but degrades the sharpness of the projected image. The reduced image sharpness may actually improve realism by closely duplicating the optical properties of haze in the outdoors line of sight.

Fuzzy yarn does not have a clearly defined diameter. The filaments 28 made of fuzzy yarn consequently tend not to lie contiguously side by side as was specified for twine. When fuzzy yarn is spaced close enough to give a screen without gaps, interference between fibers 38 of adjacent filaments 28 tends to prevent the neatly ordered array as is possible with twine. Instead, filaments tend to be somewhat displaced forward and backward out of the nominal plane of the screen. Thus it is desirable to add more fuzzy filaments to the screen to reduce the effect of the disorder until a substantially smooth appearing screen is attained. An example of a fuzzy yarn which meets the criterion set forth herein is a carpet yarn manufactured by the DuPont Company of Wilmington, Delaware under the trade name Antron II Nylon. Screens made from fuzzy yarn are preferably used with front projection only.

The backstop 20 should stop the ball, preferably silently, and allow it to fall down into the trough 22. There should not be a tendency for the backstop 20 to rebound the ball back into or through the screen 14. A net screen limply suspended has been found to effectively and silently stop the ball and drop it into the trough 22. The suspension means, not shown, should be sufficiently compliant to allow a one-foot to four-foot backward excursion of the impacted portion of the backstop 20.

The trough 22, located at the foot of the backstop 20 receives the stopped balls. The trough 22 is preferably inclined backwardly from the screen 14 in order that any tendency of the balls to bounce upon hitting the trough 22 will not result in the ball hitting or passing back through the screen. In addition, the ball-impacting areas of the trough are preferably covered with sound-deadening materials, e.g. foam rubber, textile material or the like.

It will be understood that the claims are intended to cover all changes and modifications of the preferred embodiments of the invention, herein chosen for the purpose of illustration, which do not constitute departures from the spirit and scope of the invention.

What is claimed is:

1. A projection screen comprising:
   (a) two spaced support members:
   (b) a plurality of substantially parallel and substantially contiguous runs of strands between said support members forming a substantially planar screen surface between said support members;
   (c) each of said strands being subjected to an axially directed tension of from about $L^2/7.2$ to about $L^2/36$ pounds where L is the length of said runs in feet; and
   (d) each of said strands having a breaking strength greater than 10 pounds.

2. A projection screen as recited in claim 1 further comprising:
   (a) a flexible backstop spaced behind said planar screen surface;
   (b) suspension means for said backstop; and
   (c) said suspension means being adapted to allow rearward motion of said flexible backstop of from about one foot to about four feet.

3. A projection screen as recited in claim 2 further comprising:
   (a) a ball-receiving trough associated with said backstop;
   (b) said trough being placed at the foot of said backstop;
   (c) impact surfaces on said trough inclined away from said screen; and
   (d) sound-deadening material on said impact surfaces.

4. A projection screen as recited in claim 2 wherein said backstop is a net screen having openings smaller than one inch across.

5. A projection screen as recited in claim 1 wherein said strands are cord.

6. A projection screen as recited in claim 5 wherein the mean diameter of said cord is equal to the mean center to center spacing of said runs with a tolerance of from about zero to about minus five percent.

7. A projection screen as recited in claim 1 wherein said strands are fuzzy yarn.

8. A projection screen as recited in claim 1 wherein the mean center to center spacing of said runs is small enough to produce a substantially gap-free screen surface.

9. A projection screen comprising:
   (a) spaced upper and lower linear and substantially parallel support members;
   (b) a plurality of substantially parallel and substantially contiguous runs of nylon cord between said upper and lower support members forming a substantially planar surface between said support members;

(c) each of said strands being subjected to an axially directed tension of from about $L^2/7.2$ to about $L^2/36$ pounds where L is the length of said runs in feet;

(d) said cord having a breaking strength of at least 100 pounds;

(e) a flexible fabric backstop behind said screen; and (f) a ball-receiving trough associated with said backstop.

* * * * *